(12) United States Patent
Kobayashi et al.

(10) Patent No.: US 8,619,057 B2
(45) Date of Patent: Dec. 31, 2013

(54) SIGNAL PROCESSING CIRCUIT FOR ELECTROSTATIC CAPACITOR TYPE TOUCH SENSOR

(75) Inventors: Kazuyuki Kobayashi, Midori (JP); Tatsuya Suzuki, Kumagaya (JP); Kumiko Fukai, Ora-gun (JP); Yasuhiro Kaneta, Isesaki (JP)

(73) Assignees: Sanyo Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 294 days.

(21) Appl. No.: 12/794,349

(22) Filed: Jun. 4, 2010

(65) Prior Publication Data

US 2010/0307840 A1     Dec. 9, 2010

(30) Foreign Application Priority Data

Jun. 8, 2009  (JP) ................................ 2009-137037

(51) Int. Cl.
    *G06F 3/045*  (2006.01)
(52) U.S. Cl.
    USPC ......................................................... 345/174
(58) Field of Classification Search
    USPC ................................................. 345/173–178
    See application file for complete search history.

(56) References Cited

U.S. PATENT DOCUMENTS

| | | | |
|---|---|---|---|
| RE40,867 E * | 8/2009 | Binstead | 341/33 |
| 2002/0011991 A1* | 1/2002 | Iwasaki et al. | 345/173 |
| 2006/0022959 A1* | 2/2006 | Geaghan | 345/173 |
| 2007/0242053 A1* | 10/2007 | Muranaka | 345/173 |
| 2008/0170046 A1* | 7/2008 | Rimon et al. | 345/174 |
| 2008/0218494 A1* | 9/2008 | Perski et al. | 345/174 |
| 2008/0309622 A1* | 12/2008 | Krah | 345/173 |
| 2009/0009486 A1* | 1/2009 | Sato et al. | 345/174 |

FOREIGN PATENT DOCUMENTS

JP       2005-190950      7/2005

* cited by examiner

*Primary Examiner* — Chanh Nguyen
*Assistant Examiner* — Sanghyuk Park
(74) *Attorney, Agent, or Firm* — McDermott Will & Emery LLP

(57) ABSTRACT

The invention realizes certainly detecting two or more positions on a touch panel that are touched at the same time. A drive circuit selects one from X lines, and supplies an alternating drive voltage to the selected line. A multiplexer selects a first sense line and a second sense line from Y lines that extend to cross the X lines. A charge amplifier outputs an output voltage corresponding to a difference between a first capacitance between the first sense line and the X line selected by the drive circuit and a second capacitance between the second sense line and the X line selected by the drive circuit. A touch position is then detected based on the output voltage of the charge amplifier.

5 Claims, 9 Drawing Sheets

CHARGE ACCUMULATION MODE

CHARGE TRANSFER MODE

SIGNAL PROCESSING CIRCUIT FOR ELECTROSTATIC CAPACITOR TYPE TOUCH SENSOR

CROSS-REFERENCE OF THE INVENTION

This application claims priority from Japanese Patent Application No. 2009-137037, the content of which is incorporated herein by reference in its entirety.

BACKGROUND OF THE INVENTION

1. Field of the Invention

The invention relates to a signal processing circuit for an electrostatic capacitor type touch sensor.

2. Description of the Related Art

A touch sensor is conventionally known as an input device for various types of electronic device such as a cellular phone, a portable audio device, a portable game device, a television or a personal computer.

FIG. 10 shows a touch sensor including a touch panel 1, and m numbers of X lines XL1 to XLm are formed on the touch panel 1 in the X direction, and n numbers of Y lines YL1 to YLn are formed in the Y direction so as to cross the X lines XL1 to XLm. The X lines XL1 to XLm and the Y lines YL1 to YLn are insulated by an insulation layer and are capacitively coupled.

An X sensor IC 2 is an IC that detects a capacitance change occurring in the X lines XL1 to XLm by the touch of a human finger, and a Y sensor IC 3 is an IC that detects a capacitance change occurring in the Y lines XL1 to XLn by the touch of a human finger.

For example, when a human finger touches a point P1 that is the intersection of the X line XL1 and the Y line YL1 in FIG. 10, the X sensor IC 2 detects the capacitance change of the X line XL1 and outputs a detection signal, and the Y sensor IC 3 detects the capacitance change of the Y line YL1 and outputs a detection signal. The touch to the point P1 is thus detected. A relevant technique is described in Japanese Patent Application publication No. 2005-190950.

In the touch sensor described above, however, in a case of multiple touches such as when two points are touched at the same time, there arises a problem that the two points are not distinguished. For example, when the points P1 and P2 in FIG. 10 are touched at the same time, the X sensor IC 2 detects the capacitance changes of the X lines XL1 and XL2 and outputs detection signals for these, and the Y sensor IC 3 detects the capacitance changes of the Y lines YL1 and YL2 and outputs detection signals for these. Since the same detection signals are also outputted when the points P3 and P4 in FIG. 10 are touched at the same time, these are hardly distinguished.

SUMMARY OF THE INVENTION

The invention provides a signal processing circuit for an electrostatic capacitor type touch sensor having a plurality of drive lines disposed on a substrate and a plurality of sense lines disposed on the substrate and intersecting the drive lines. The signal processing circuit includes a drive circuit selecting one of the drive lines and supplying an alternating drive voltage to the selected drive line, a multiplexer selecting a first sense line and a second sense line from the sense lines, and a charge amplifier outputting an output voltage corresponding to a difference between a first capacitance and a second capacitance, where the first capacitance is detected between the first sense line selected by the multiplexer and the drive line selected by the drive circuit, and the second capacitance is detected between the second sense line selected by the multiplexer and the drive line selected by the drive circuit.

The invention also provides another signal processing circuit for an electrostatic capacitor type touch sensor. That signal processing circuit includes a drive circuit selecting one of the drive lines and supplying an alternating drive voltage to the selected drive line, a multiplexer selecting a sense line from the sense lines, a reference capacitor, and a charge amplifier outputting an output voltage corresponding to a difference between a capacitance of the reference capacitor and a capacitance detected between the sense line selected by the multiplexer and the drive line selected by the drive circuit.

DETAILED DESCRIPTION OF THE INVENTION

An embodiment of the invention will be described referring to figures.

Figure 1:
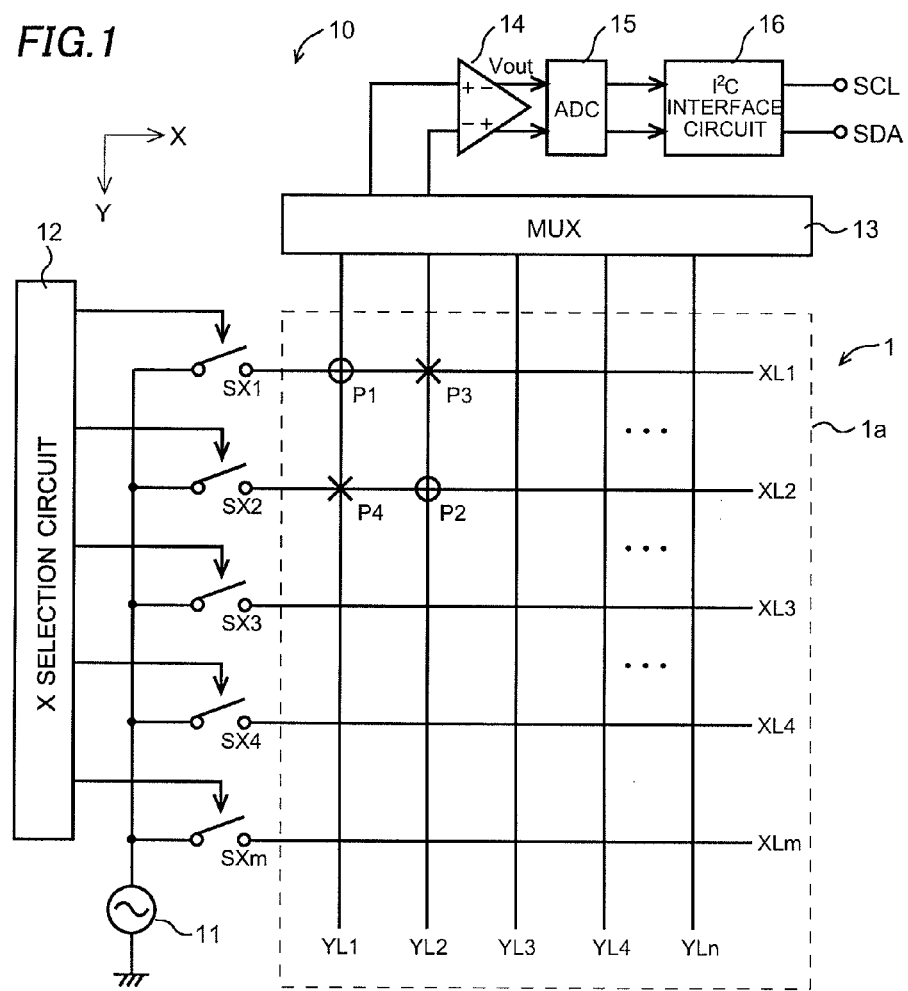
FIG. 1 is a diagram showing a signal processing circuit for an electrostatic capacitor type touch sensor of a first embodiment of the invention.

A touch sensor of a first embodiment includes a touch panel 1 and a signal processing circuit 10 as shown in FIG. 1. The touch panel 1 is formed of a substrate 1a made of glass or the like, and m numbers of X lines XL1 to XLm are formed on the substrate 1a in the X direction. Furthermore, n numbers of Y lines YL1 to YLn are formed on the substrate 1a in the Y direction so as to cross the X lines XL1 to XLm. The X lines XL1 to XLm and the Y lines YL1 to YLn are insulated by an insulation layer and capacitively coupled. These X lines XL1 to XLm and Y lines YL1 to YLn are preferably formed of a transparent electrode such as ITO.

The signal processing circuit 10 detects a touch position by selectively driving the X lines XL1 to XLm of the touch panel 1 and detecting the capacitance change of the Y lines YL1 to YLn. In this case, the X lines XL1 to XLm are drive lines and the Y lines YL1 to YLn are sense lines. The signal processing circuit 10 includes an alternating current power supply 11 generating an alternating drive voltage (including a pulse voltage), an X selection circuit 12, switches SX1 to SXm, a multiplexer 13, a charge amplifier 14, an AD converter 15, and an interface that communicates with an external circuit, such as an I²C interface circuit 16.

The switch SXi (i=1 to m) is provided between the alternating current power supply 11 and the X line XLi (i=1 to m), and when the switch SXi turns on, an alternating drive voltage is supplied from the alternating current power supply 11 to the X line XLi. The X selection circuit 12 outputs control signals φ1 to φm that control the on and off of the switches SX1 to SXm. The control signals φ1 to φm are pulse signals, and formed by delaying a reference pulse signal sequentially. The alternating current power supply 11, the switches SX1 to SXm and the X selection circuit 12 form a drive circuit.

Figure 2:
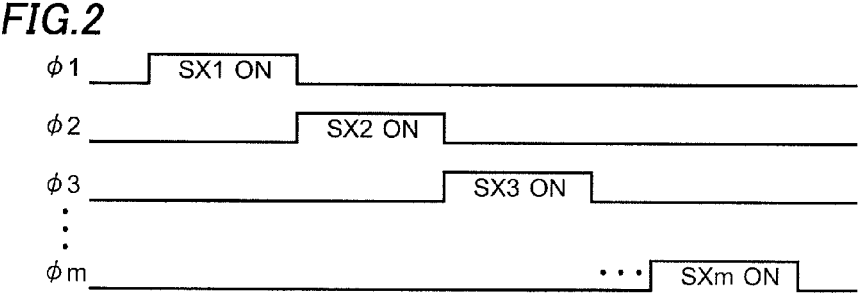
FIG. 2 is an operation timing chart of the signal processing circuit.

In detail, as shown in FIG. 2, first, during the H level period of the control signal φ1, the other control signals φ2 to φm are L level and only the switch SX1 turns on. Therefore, during this period, an alternating drive voltage is supplied from the alternating current power supply 11 to the X line XL1. Then, during the H level period of the control signal φ2, the other control signals φ1, φ3 to φm are L level and only the switch SX2 turns on. Therefore, during this period, an alternating drive voltage is supplied from the alternating current power supply 11 to the X line XL2. In the same manner, Y direction scanning is then performed.

The multiplexer 13 selects the first Y line YLs and the second Y line YLs+1 from the Y lines YL1 to YLn sequentially in each of the periods in which each of the switches SX1 to SXm turns on. It means that X direction scanning is performed in the manner in which the first Y line YL1 and the second Y line YL2 are selected, then the third Y line YL3 and the fourth Y line YL4 are selected, and then the fifth Y line YL5 and the sixth Y line YL6 are selected.

The selected first and second Y lines YLs and YLs+1 are inputted to the non-inverting input terminal (+) and the inverting input terminal (−) of the charge amplifier 14, respectively. The charge amplifier 14 outputs an output voltage Vout corresponding to a difference between a first capacitance between the first Y line YLs and the X line XLi selected by the X selection circuit 12 and a second capacitance between the second Y line YLs+1 and the X line XLi selected by the X selection circuit 12.

Figure 3:
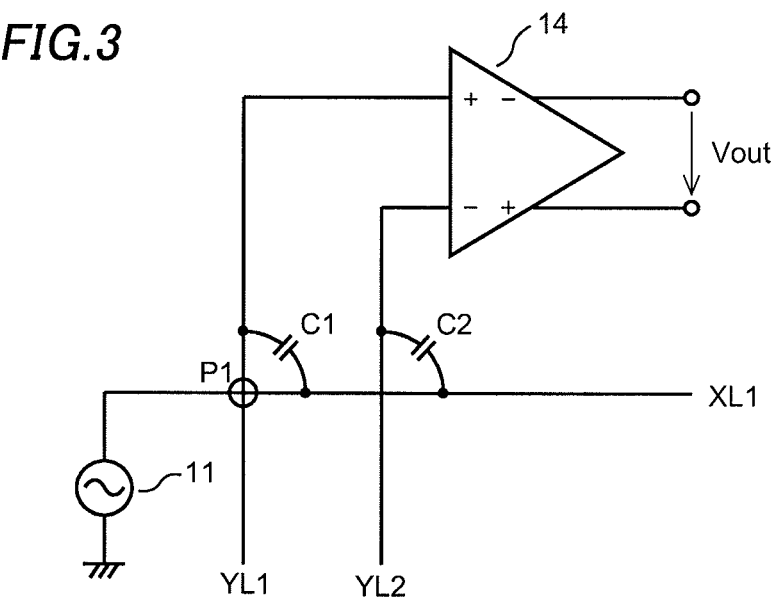
FIG. 3 is a circuit diagram showing an example of the connection relation of lines selected by a multiplexer and a charge amplifier.

FIG. 3 shows an example of the connection relation of lines selected by the multiplexer 13 and the charge amplifier 14. In this example, the X line XL1 is selected by the X selection circuit 12, and the first Y line YL1 and the second Y line YL2 are selected by the multiplexer 13. Therefore, in the state where an alternating drive voltage is supplied from the alternating current power supply 11 to the X line XL1, the first Y line YL1 is connected to the non-inverting input terminal (+) of the charge amplifier 14 and the second Y line YL2 is connected to the inverting input terminal (−) of the charge amplifier 14.

Then the charge amplifier 14 outputs an output voltage Vout corresponding to a difference between the first capacitance CA1 of an electrostatic capacitor C1 formed between the first Y line YL1 and the X line XL1 and the second capacitance CA2 of an electrostatic capacitor C2 formed between the second Y line YL2 and the X line XL1.

Figure 4:
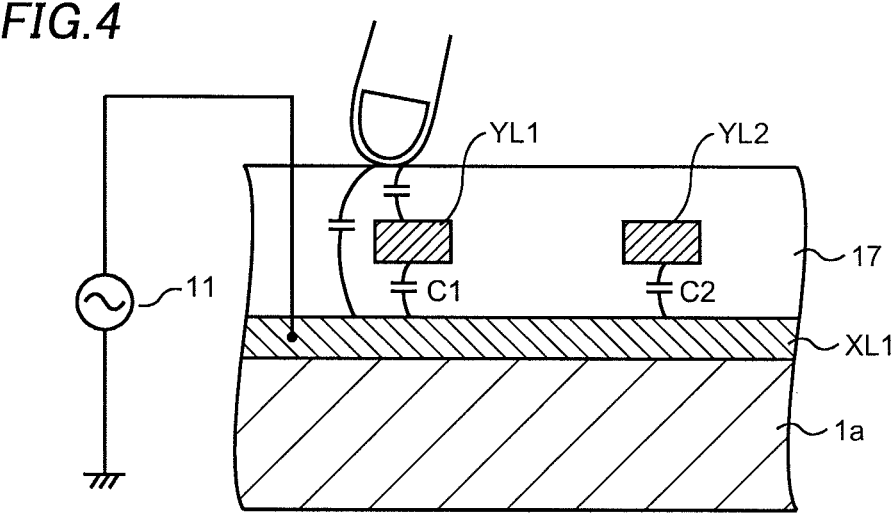
FIG. 4 is a cross-sectional view of the electrostatic capacitor type touch sensor.

FIG. 4 is a cross-sectional view of the electrostatic capacitor type touch sensor in this case. As shown in the figure, the X line XL1 is disposed on the substrate 1a, and the first Y line YL1 and the second Y line YL2 are disposed thereabove through an insulation layer 17.

In the state where these are not touched by a human finger, CA1=CA2, and the output voltage Vout of the charge amplifier 14 is 0 V. When a human finger touches a point P1 at the intersection of the first Y line YL1 and the X line XL1, the capacitance CA1 changes relative to the capacitance CA2. This is because that a human finger has conductivity and functions as a capacitor electrode and thus an electrostatic capacitor occurs between the finger and the X line XL1 and between the finger and the first Y line YL1.

As a result, when CA1>CA2, for example, the output voltage Vout of the charge amplifier 14 becomes a positive (+) voltage. X direction scanning is then continued by the multiplexer 13, but in the other two Y lines (e.g. the Y line YL3 and the Y line YL4) selected by the multiplexer 13, the output voltage Vout of the charge amplifier 14 keeps 0 V. A touch position is thus detected based on the output voltage Vout of the charge amplifier 14.

Next, multiple touch detection will be described. As shown in FIG. 1, it is supposed that the points P1 and P2 on the touch panel 1 are touched at the same time. In this case, the detection of the point P1 is performed in the same manner as above when the X line XL1 is driven.

As to the point P2, the detection is performed when the next X line XL2 is driven. When the first Y line YL1 and the second Y line YL2 are selected by the multiplexer 13, in the state where an alternating drive voltage is supplied from the alternating current power supply 11 to the X line XL2, the first Y line YL1 is connected to the non-inverting input terminal (+) of the charge amplifier 14, and the second Y line YL2 is connected to the inverting input terminal (−) of the charge amplifier 14. In this case, since the capacitance CA2 increases relative to the capacitance CA1, the output voltage Vout of the charge amplifier 14 becomes a negative (−) voltage. The point P2 is thus detected. As described above, the intersections on the touch panel 1 are detected respectively by the X direction scanning and Y direction scanning, and thus the touch to the points P1 and P2 and the touch to the points P3 and P4 as shown in FIG. 1 are distinguished.

Furthermore, since the embodiment employs a differential capacitance detection method, noise resistance is enhanced. For example, when noise is applied to the selected first Y line YL1 and second Y line YL2, the noises are cancelled by each other and the noise hardly influences the output voltage Vout of the charge amplifier 14.

Although the multiplexer 13 sequentially selects the first Y line YLs and the second Y line YLs+1 that are disposed next to each other from the Y lines YL1 to YLn, the multiplexer 13 may sequentially select two Y lines that are not disposed next to each other.

Furthermore, the multiplexer 13 may select only one first Y line YLs sequentially. In this case, the first Y line YLs selected by the multiplexer 13 is connected to the non-inverting input terminal (+) of the charge amplifier 14. Any one of the Y lines YL1 to YLn is connected to the inverting input terminal (−) of the charge amplifier 14. Alternatively, instead of any one of the Y lines YL1 to YLn, a dummy Y line may be connected to the inverting input terminal (−) of the charge amplifier 14. The dummy Y line crosses the X lines XL1 to XLm in the same manner to the Y lines YL1 to YLn.

The output voltage Vout of the charge amplifier 14 is converted to a digital signal by the AD converter 15. This digital signal is outputted outside the touch sensor through the I²C interface circuit 16 as serial data synchronized with a serial clock SCL. Then the signal is received by a microcomputer (not shown) provided outside, and signal processing for determining the touch position is performed.

Figure 5:
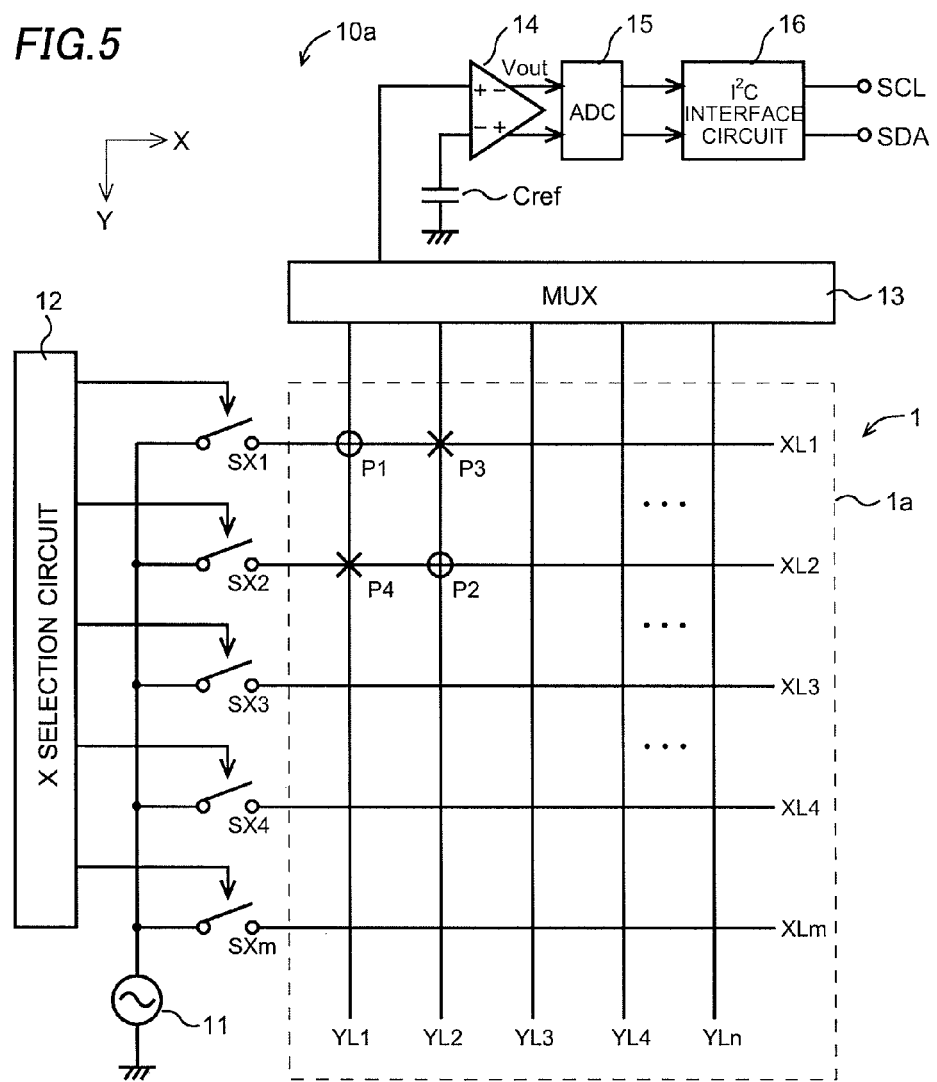
FIG. 5 is a diagram showing a signal processing circuit for an electrostatic capacitor type touch sensor of a second embodiment of the invention.

FIG. 5 is a diagram showing a signal processing circuit 10a of an electrostatic capacitor type touch sensor of a second embodiment of the invention. As shown in the figure, the multiplexer 13 selects only one Y line YLs from the Y lines YL1 to YLn on the touch panel 1 sequentially in each of the periods in which each of the switches SX1 to SXm turns on. For example, in the period in which the switch SX1 turns on and an alternating drive voltage is supplied to the X line XL1, the Y line YL1 is selected, then the Y line YL2 is selected, and then the Y line YL3 is selected. Selections are then made in the same manner as this.

Then the selected Y line YLs is connected to the non-inverting input terminal (+) of the charge amplifier 14. A reference capacitor Cref is connected to the inverting input terminal (−) of the charge amplifier 14. Therefore, the charge amplifier 14 outputs an output voltage Vout corresponding to a difference between the capacitance CA1 between the Y line YLs selected by the multiplexer 13 and the X line XLi selected by the drive circuit and the capacitance CAref of the reference capacitor Cref.

When the intersection of the Y line YLs and the X line XLi is not touched, CA1=CAref, and the output voltage Vout of the charge amplifier 14 is 0 V. When the intersection of the Y line YLs and the X line XLi is touched, CA1>CAref, and the output voltage Vout of the charge amplifier 14 is a positive (+) voltage. The detection of a touch position is achieved in this manner like in the first embodiment.

Figure 6:
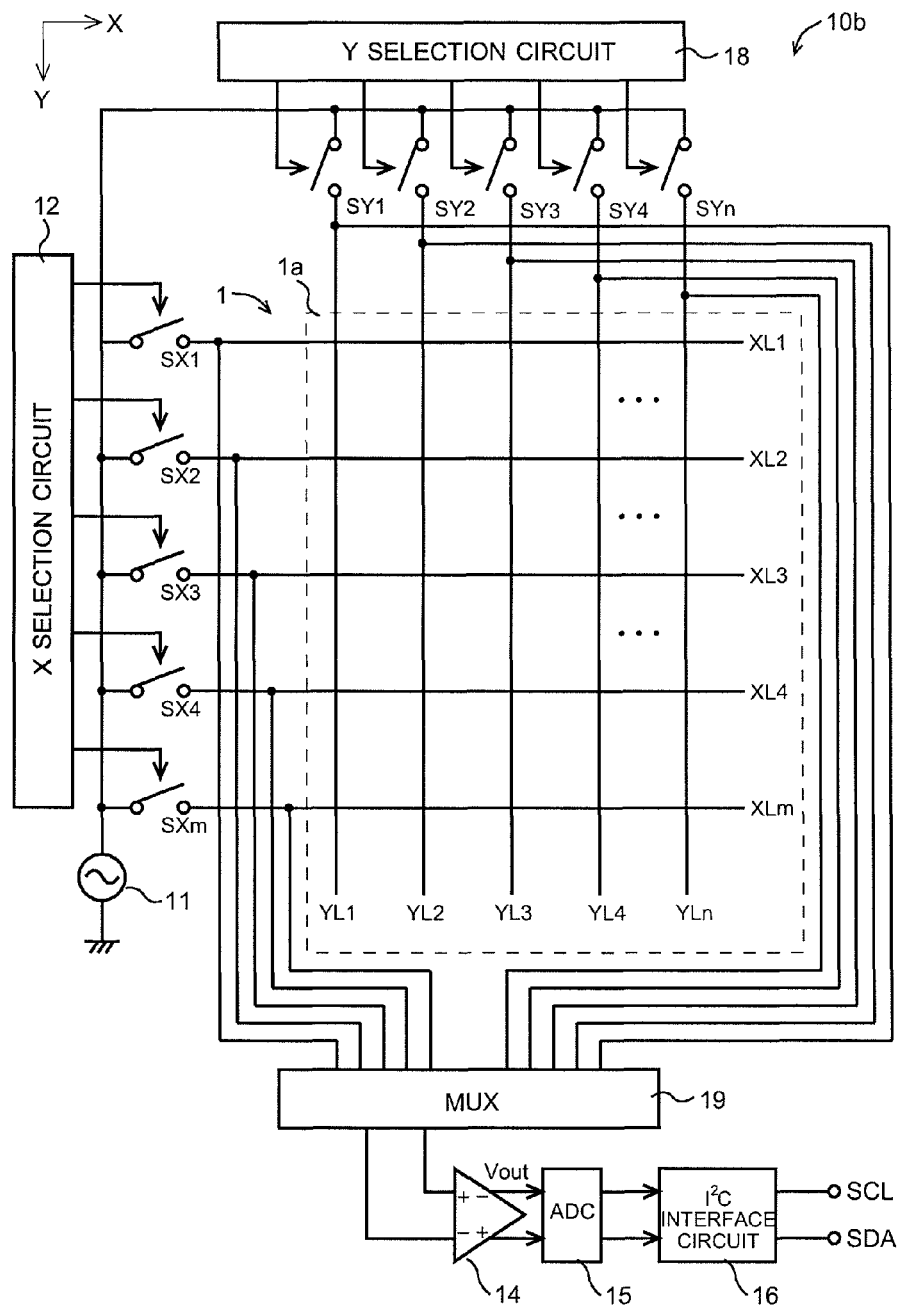
FIG. 6 is a diagram showing a signal processing circuit for an electrostatic capacitor type touch sensor of a third embodiment of the invention.

FIG. 6 is a diagram showing a signal processing circuit 10b of an electrostatic capacitor type touch sensor of a third embodiment of the invention. In the first embodiment, the X lines XL1 to XLm of the touch panel 1 are used as drive lines, and the Y lines YL1 to YLn are used as sense lines. The X selection circuit 12, the switches SX1 to SXm, and the multiplexer 13 are provided correspondingly.

In this embodiment, the X lines XL1 to XLm and the Y lines YL1 to YLn of the touch panel 1 form a signal processing circuit so that either ones serve as drive lines while the others serve as sense lines. In detail, in the signal processing circuit 10b, a Y selection circuit 18 and switches SY1 to SYn, that are configured like the X selection circuit 12 and the switches SX1 to SXm, are added to the Y lines YL1 to YLn.

In detail, the switch SYj (j=1 to n) is provided between the alternating current power supply 11 and the Y line YLj (j=1 to n). When the switch SYj turns on, an alternating drive voltage is supplied from the alternating current power supply 11 to the Y line YLi. The Y selection circuit 18 outputs control signals that control the on and off of the switches SY1 to SYn.

A multiplexer 19 is configured so as to select the Y lines YL1 to YLn as well as the X lines XL1 to XLm. Therefore, the Y lines YL1 to YLn are usable as drive lines and the X lines XL1 to XLm are usable as sense lines in the opposite manner to the first embodiment.

Figure 11:
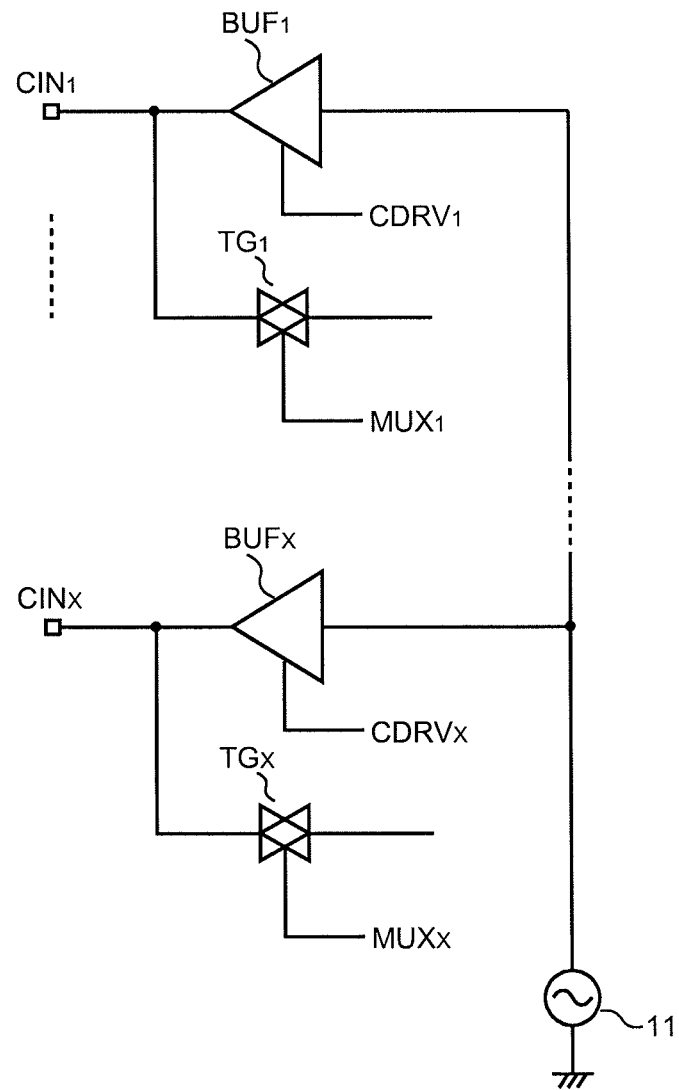
FIG. 11 is a concrete circuit diagram of the signal processing circuit.

In the signal processing circuit 10b, it is preferable to configure the X selection circuit 12, the switches SX1 to SXm, the Y selection circuit 18, the switches SY1 to SYn, and the multiplexer 19 as shown in FIG. 11. As shown in the figure, for terminals $CIN_1$ to $CIN_X$ (X=n+m), output buffers $BUF_1$ to $BUF_X$ and transfer gates $TG_1$ to $TG_X$ are provided.

An alternating drive voltage from the alternating current power supply 11 is inputted to the output buffers $BUF_1$ to $BUF_X$, and the output buffers $BUF_1$ to $BUF_X$ are controlled by control signals $CDRV_1$ to $CDRV_X$ respectively. When the corresponding control signals $CDRV_1$ to $CDRV_X$ are first level (e.g. H level), the output buffers $BUF_1$ to $BUF_X$ function as output buffers. When the control signals $CDRV_1$ to $CDRV_X$ are second level (e.g. L level), the output impedances are set to high. It means that the output buffers $BUF_1$ to $BUF_X$ are circuits that are equivalent to the X selection circuit 12, the switches SX1 to SXm, the Y selection circuit 18 and the switches SY1 to SYn.

Furthermore, the on and off of the transfer gates $TG_1$ to $TG_X$ are controlled by corresponding control signals $MUX_1$ to $MUX_X$. The transfer gates $TG_1$ to $TG_X$ are circuits that are equivalent to the multiplexer 19. With this structure, since the circuits having the same structures are disposed for the terminals $CIN_1$ to $CIN_X$ (X=n+m), space wasting on the semiconductor die is eliminated to decrease the die size. This structure is also applicable to the X selection circuit 12, the switches SX1 to SXm and the multiplexer 13 of the first embodiment (FIG. 1).

Figure 7:
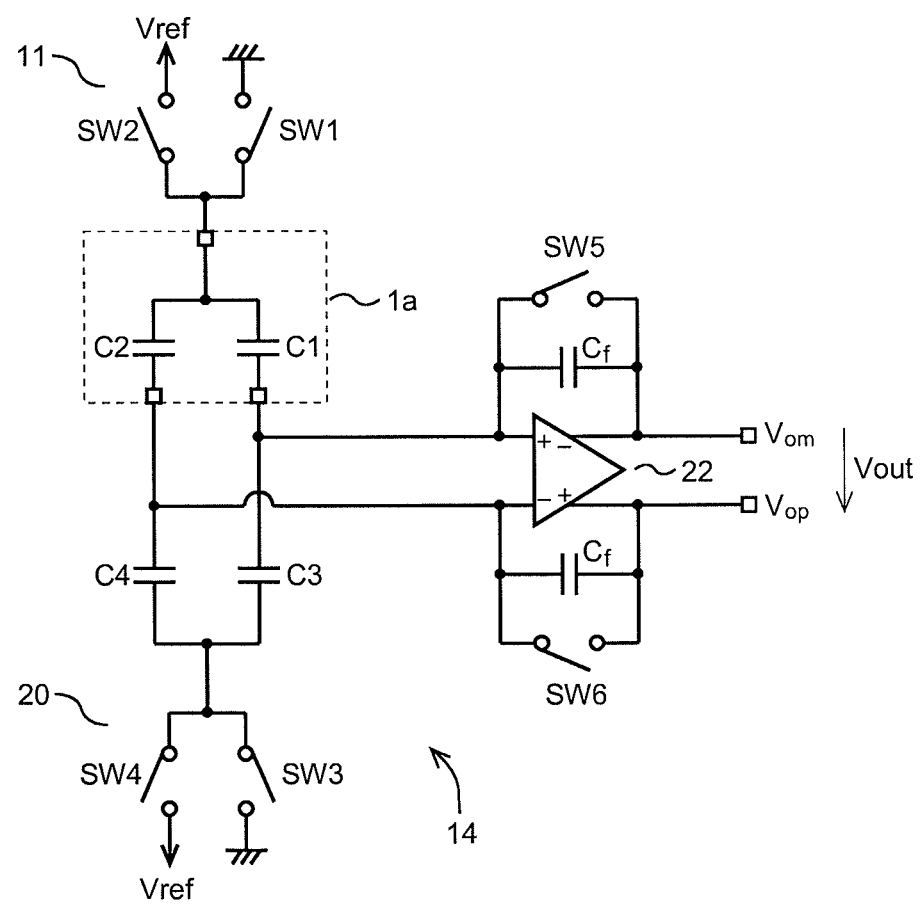
FIG. 7 is a circuit diagram of the charge amplifier.

Hereafter, an example of the structure of the charge amplifier 14 will be described in detail referring to FIGS. 7, 8A and 8B. The first electrostatic capacitor C1 and the second electrostatic capacitor C2 are formed on the substrate 1a that is shown as a portion encircled by a dashed line in FIG. 7. For example, the first electrostatic capacitor C1 and C2 correspond to C1 and C2 shown in FIG. 3 respectively. Portions of the structure except for the substrate 1a make the signal processing circuit.

The alternating current power supply 11 is formed of switches SW1 and SW2 that are switched alternately. The alternating current power supply 11 outputs the ground voltage (0 V) when the switch SW1 is closed and the switch SW2 is opened, and outputs the excitation voltage Vref (positive voltage) when the switch SW1 is opened and the switch SW2 is closed. In this case, the alternating current power supply 11 outputs a clock signal voltage alternating between Vref (H level) and 0 V (L level).

A third electrostatic capacitor C3 is connected in series with the first electrostatic capacitor C1, while a fourth electrostatic capacitor C4 is connected in series with the second electrostatic capacitor C2. It is preferable that the capacitances CA3 and CA4 of the electrostatic capacitors C3 and C4 are equal and approximately equal to the capacitances CA1 and CA2 of the electrostatic capacitors C1 and C2.

An alternating current power supply 20, that is identical to the alternating current power supply 11, is connected to a connecting node between the third capacitor C3 and the fourth capacitor C4. The alternating current power supply 20 is formed of switches SW3 and SW4 that are switched alternately. The alternating current power supply 20 outputs the ground voltage (0 V) when the switch SW3 is closed and the switch SW4 is opened, and outputs the excitation voltage Vref (positive voltage) when the switch SW3 is opened and the switch SW4 is closed. The alternating current power supply 11 and the alternating current power supply 20 output clock signal voltages that are opposite in phase to each other.

Reference numeral 22 indicates an ordinary differential amplifier. A wiring drawn out from a connecting node N2 between the first and third electrostatic capacitors C1 and C3 is connected to the non-inverting input terminal (+) of the differential amplifier 22, while a wiring drawn out from a connecting node N1 between the second and fourth electrostatic capacitors C2 and C4 is connected to the inverting input terminal (−) of the differential amplifier 22.

A feedback capacitor Cf is connected between the inverting output terminal (−) and the non-inverting input terminal (+) of the differential amplifier 22, while an identical feedback capacitor Cf is connected between the non-inverting output terminal (+) and the inverting input terminal (−) of the differential amplifier 22. Each of the feedback capacitors Cf has a capacitance CAf.

A switch SW5 is connected between the inverting output terminal (−) and the non-inverting input terminal (+) of the differential amplifier 22, while a switch SW6 is connected between the non-inverting output terminal (+) and the inverting input terminal (−) of the differential amplifier 22. The switches SW5 and SW6 are switched simultaneously. That is, when the switches SW5 and SW6 are closed, the inverting output terminal (−) and the non-inverting input terminal (+) of the differential amplifier 22 are short-circuited, and the non-inverting output terminal (+) and the inverting input terminal (−) of the differential amplifier 22 are short-circuited.

A voltage difference between an output voltage Vom from the inverting output terminal (−) of the differential amplifier 22 and an output voltage Vop from the non-inverting output terminal (+) of the differential amplifier 22 is represented by Vout (=Vop−Vom).

Next, operations of the circuit structured as described above will be explained referring to FIGS. 8A and 8B. The circuit has a charge accumulation mode and a charge transfer mode that alternate many times.

Figure 8A:
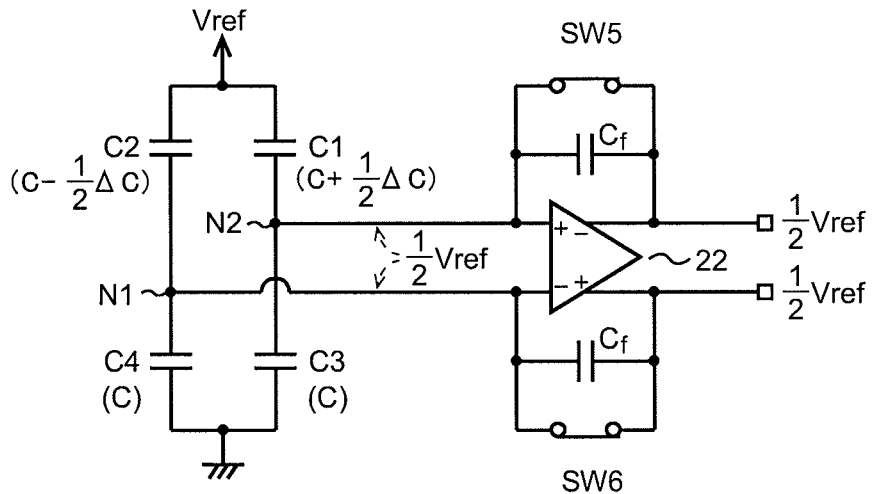
FIGS. 8A and 8B are diagrams for explaining the operation of the charge amplifier.

In the charge accumulation mode that is shown in FIG. 8A, the excitation voltage Vref is applied to the first and second electrostatic capacitors C1 and C2 by opening the switch SW1 and closing the switch SW2 of the alternating current power supply 11. Also, the ground voltage (0 V) is applied to the third and fourth electrostatic capacitors C3 and C4 by opening the switch SW4 and closing the switch SW3 of the alternating current power supply 20.

Also, the switches SW5 and SW6 are closed. With this, the inverting output terminal (−) and the non-inverting input terminal (+) of the differential amplifier 22 are short-circuited while the non-inverting output terminal (+) and the inverting input terminal (−) are short-circuited. As a result, a voltage at the node N1 (node of the wiring connected to the inverting input terminal (−)), a voltage at the node N2 (node of the wiring connected to the non-inverting input terminal (+)), a voltage at the inverting output terminal (−) and a voltage at the non-inverting output terminal (+) all become ½ Vref. Here, ½ Vref is a common mode voltage of the differential amplifier 22, which is a half of the excitation voltage Vref.

Figure 8B:
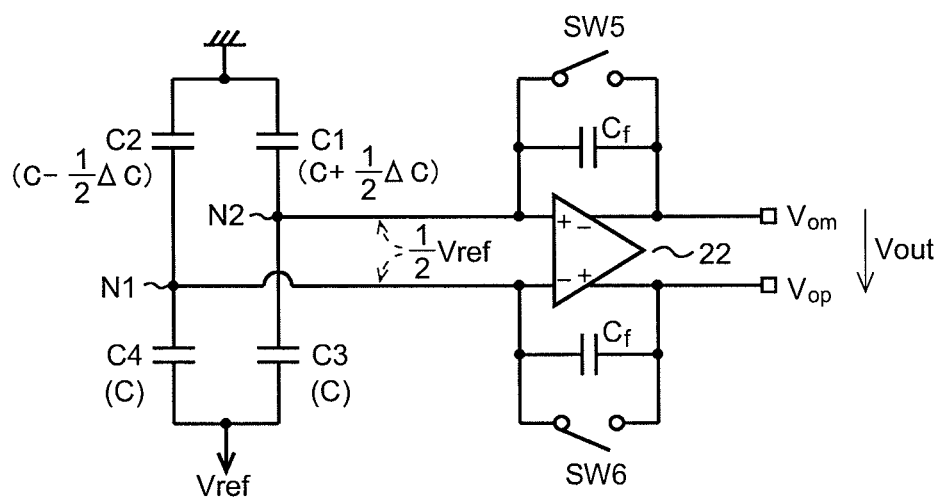

Next, in the charge transfer mode that is shown in FIG. 8B, the ground voltage (0 V) is applied to the first and second electrostatic capacitors C1 and C2 by closing the switch SW1 and opening the switch SW2 of the alternating current power supply 11. Also, the excitation voltage Vref is applied to the third and fourth electrostatic capacitors C3 and C4 by closing the switch SW4 and opening the switch SW3 of the alternating current power supply 20. Also, the switches SW5 and SW6 are opened.

After that, the circuit returns to the charge accumulation mode in FIG. 8A, and then turns to the charge transfer mode again. The charge amplifier 14 reaches a stable state after repeating the operations described above a multitude of times.

In this case, CA3=CA4=C, where C is the capacitance of each of the capacitors C1 and C2 in the initial state. When a finger of an operator approaches a touch pad, there is caused a capacitance difference ΔC between the capacitances CA1 and CA2. That is, CA1−CA2=ΔC. Then, equations CA1=C+½ΔC and CA2=C−½ΔC hold.

In the charge accumulation mode,

Amount of Electric Charges at $N1 =$ [Equation 1]

$$\left(C - \frac{1}{2}\Delta C\right) \cdot \left(-\frac{1}{2}Vref\right) + C \cdot \left(\frac{1}{2}Vref\right) + CAf \cdot 0$$

where $(C-\frac{1}{2}\Delta C)\cdot(-\frac{1}{2}\text{Vref})$ represents an amount of electric charges stored in C2, $C\cdot(\frac{1}{2}\text{Vref})$ represents an amount of electric charges stored in C4 and $CAf\cdot 0(=0)$ represents an amount of electric charges stored in Cf.

In the charge transfer mode,

Amount of Electric Charges at $N1 =$ [Equation 2]

$$\left(C - \frac{1}{2}\Delta C\right) \cdot \left(\frac{1}{2}Vref\right) +$$
$$C \cdot \left(-\frac{1}{2}Vref\right) + CAf \cdot \left(Vop - \frac{1}{2}Vref\right)$$

where $(C-\frac{1}{2}\Delta C)\cdot(\frac{1}{2}\text{Vref})$ represents an amount of electric charges stored in C2, $C\cdot(-\frac{1}{2}\text{Vref})$ represents an amount of electric charges stored in C4 and $CAf\cdot(\text{Vop}-\frac{1}{2}\text{Vref})$ represents an amount of electric charges stored in Cf.

[Equation 1]=[Equation 2], since the amount of electric charges at N1 in charge accumulation mode is equal to the amount of electric charges at N1 in the charge transfer mode according to the law of conservation of electric charge.

Following equation is obtained by solving [Equation 1]= [Equation 2] for Vop.

$$Vop = \left(1 + \frac{\Delta C}{CAf}\right) \cdot \frac{1}{2}Vref \quad \text{[Equation 3]}$$

Similarly, following equation is obtained by applying the law of conservation of electric charge to the electric charges at the node N2 and solving the resulting equation for Vom.

$$Vom = \left(1 - \frac{\Delta C}{CAf}\right) \cdot \frac{1}{2}Vref \quad \text{[Equation 4]}$$

Vout is obtained from [Equation 3] and [Equation 4].

$$Vout = Vop - Vom = \frac{\Delta C}{CAf} \cdot Vref \quad \text{[Equation 5]}$$

Figure 9:
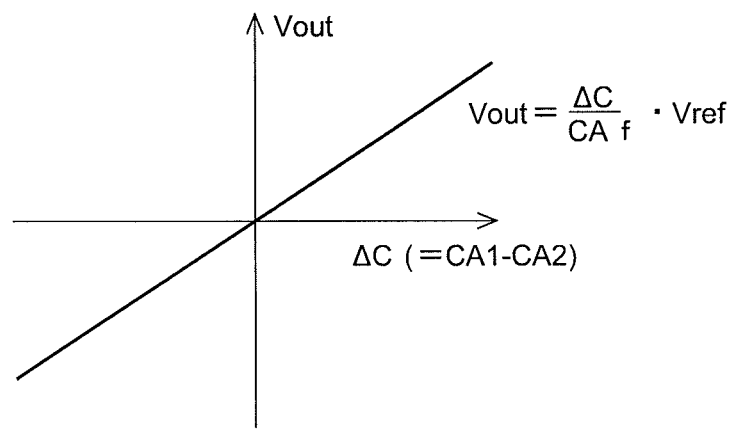
FIG. 9 is a graph showing the characteristics of the charge amplifier.
Figure 10:
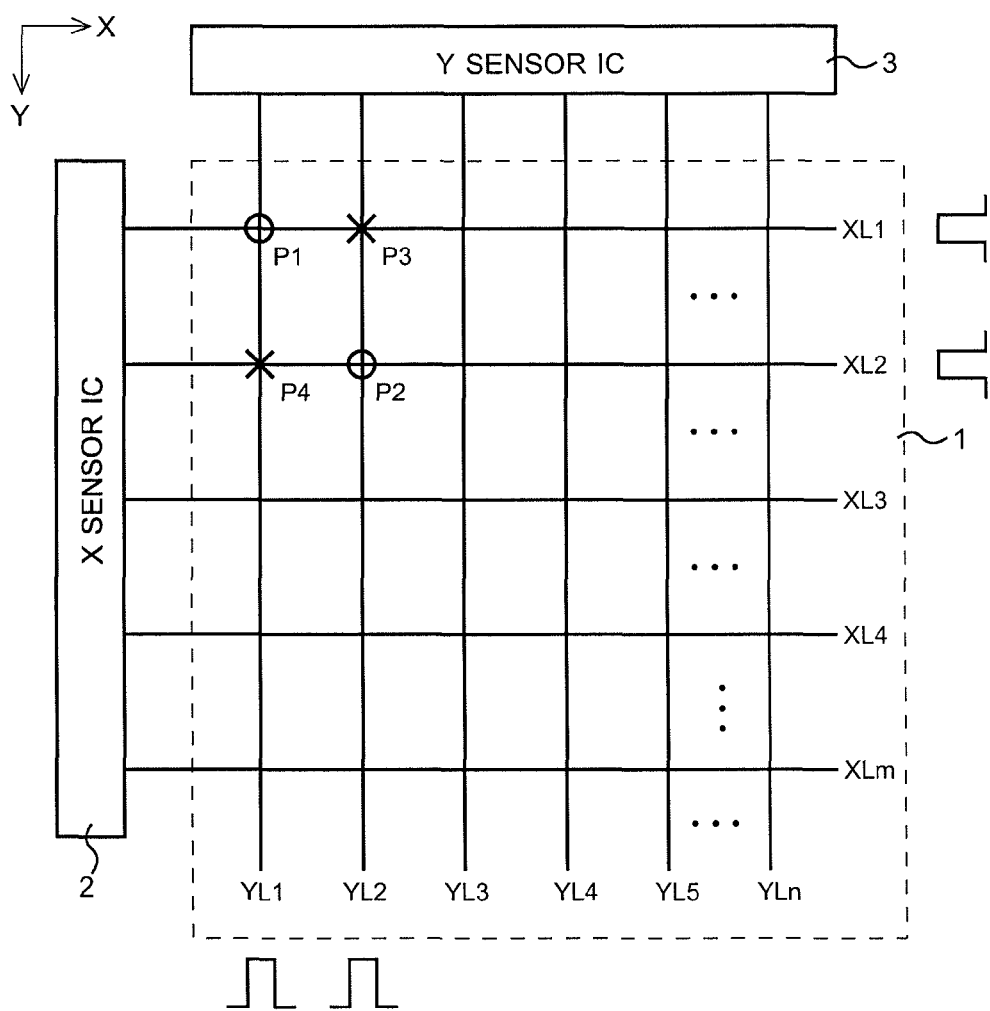
FIG. 10 is a diagram showing a conventional touch sensor.

That is, it is understood that the output voltage Vout of the charge amplifier 14 varies proportionally to the capacitance difference ΔC between the capacitances CA1 and CA2, as shown in FIG. 9.

A signal processing circuit for an electrostatic capacitor type touch sensor of the invention realizes certainly detecting two or more positions on a touch panel that are touched at the same time.

What is claimed is:

1. A signal processing circuit for an electrostatic capacitor type touch sensor comprising a plurality of drive lines disposed on a substrate and a plurality of sense lines disposed on the substrate and intersecting the drive lines, the signal processing circuit comprising:
a drive circuit selecting one of the drive lines and supplying a first alternating drive voltage to the selected drive line;
a multiplexer selecting a first sense line and a second sense line from the sense lines; and
a charge amplifier outputting an output voltage corresponding to a difference between a first capacitance of a first capacitor and a second capacitance of a second capacitor, the first capacitor being formed between the first sense line selected by the multiplexer and the drive line selected by the drive circuit, and the second capacitor being formed between the second sense line selected by the multiplexer and the drive line selected by the drive circuit, wherein the charge amplifier comprises a third capacitor, a fourth capacitor, and a differential amplifier, the first capacitor and the third capacitor are connected to each other through a first connecting node, the second capacitor and the fourth capacitor are connected to each other through a second connecting node, the differential amplifier comprises first and second input terminals, the first input terminal being connected directly to the first connecting node, and the second input terminal being connected directly to the second connecting node, the third capacitor and the fourth capacitor are connected to each other through a third connection node, and the signal processing circuit further comprising a power supply configured to supply a second alternating drive voltage to the third connection node, the first and second alternating drive voltages being opposite in phase to each other.

2. The signal processing circuit of claim 1, wherein the processing circuit is configured so that the output voltage is fed to an external device for determining a touch position.

3. The signal processing circuit of claim 1, wherein the drive circuit comprises a power supply generating the first alternating drive voltage, a plurality of switches connected between the power supply and the drive lines, and a selection circuit turning on and off the switches sequentially.

4. The signal processing circuit of claim 1, wherein the first sense line and the second sense line are disposed next to each other.

5. The signal processing circuit of claim 1, further comprising an AD converter converting the output voltage of the charge amplifier to a digital value.

* * * * *